No. 794,513. PATENTED JULY 11, 1905.
LE GRAND KNIFFEN.
MANURE SPREADER.
APPLICATION FILED MAR. 20, 1905.
2 SHEETS—SHEET 2.
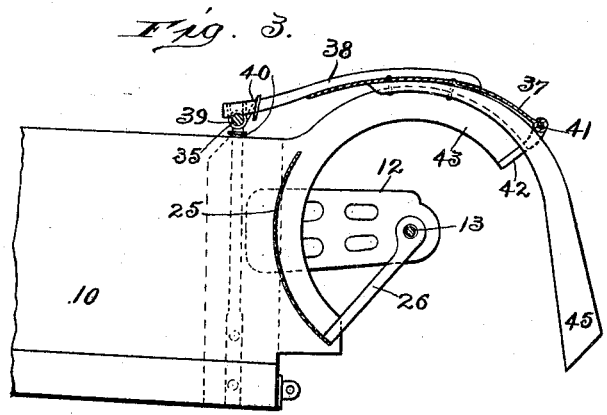
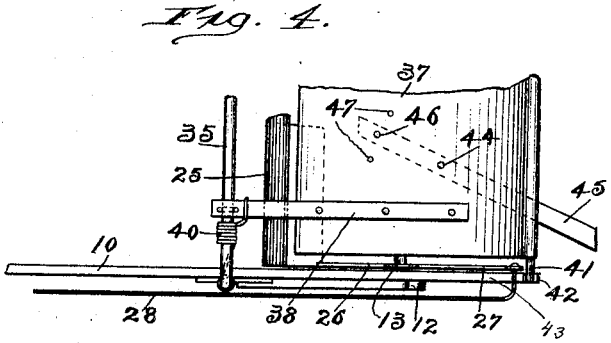
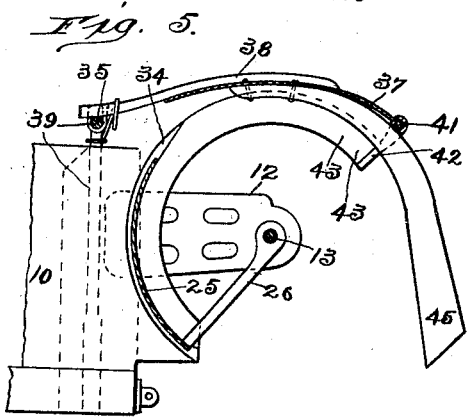
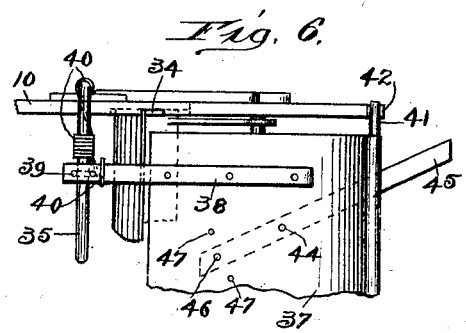
Witnesses:
Chas. E. Gorton
A. Gustafson
Inventor:
Le Grand Kniffen,
By Chas. C. Tillman
Atty.

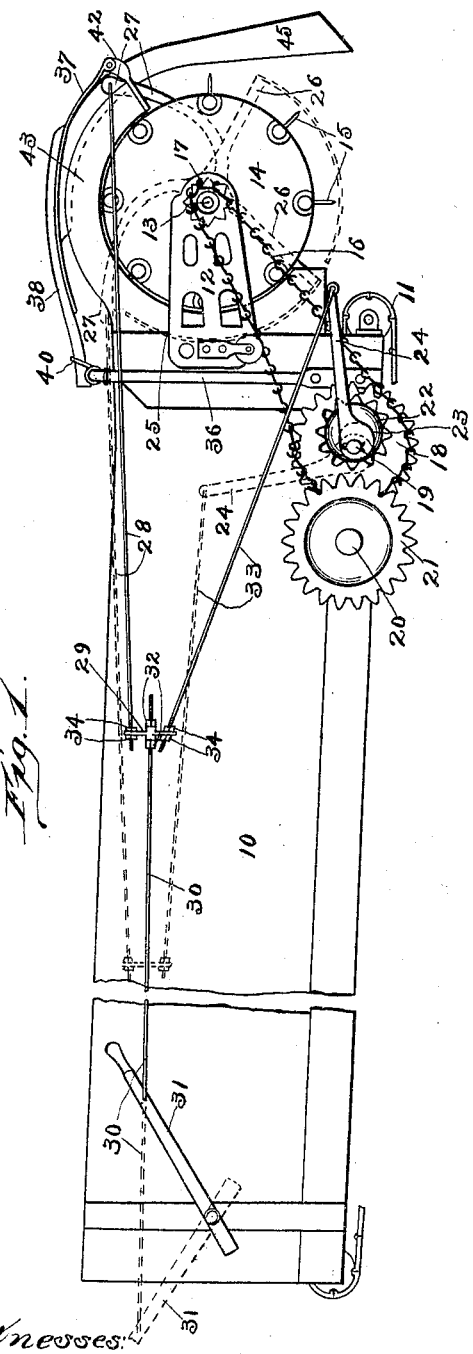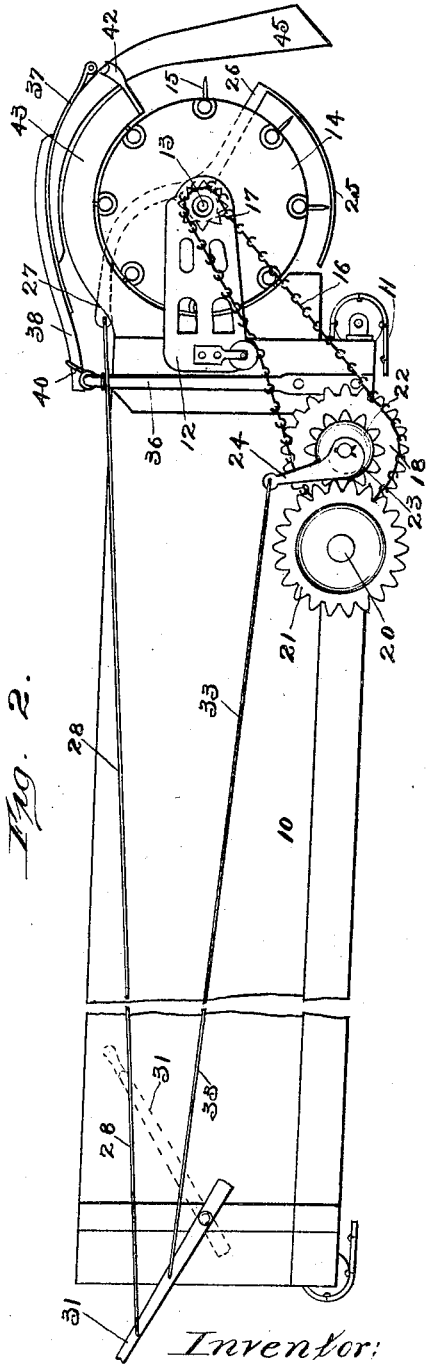

No. 794,513. Patented July 11, 1905.

UNITED STATES PATENT OFFICE.

LE GRAND KNIFFEN, OF CHICAGO, ILLINOIS.

MANURE-SPREADER.

SPECIFICATION forming part of Letters Patent No. 794,513, dated July 11, 1905.

Application filed March 20, 1905. Serial No. 250,993.

*To all whom it may concern:*

Be it known that I, LE GRAND KNIFFEN, a citizen of the United States, residing at Chicago, in the county of Cook and State of Illinois, have invented certain new and useful Improvements in Manure-Spreaders, of which the following is a specification.

My present invention relates to that class of manure-spreaders which embody a box or body mounted on a wheeled frame and having a movable bottom or conveyer upon which the manure lies and by means of which it is carried rearwardly to a rotary and toothed beater by means of which the manure or fertilizer is removed from the rear end of the body and spread on the ground, and it has relation to certain improvements which may be applied to the various kinds of spreaders of the above-named type, and especially to the novel construction, manner of mounting and operating the rear end-gate or shield employed for protecting the beater, so as to prevent the manure being thrown thereon while loading the body and to hold it away from the beater while driving to the field or until it is desired to discharge the load.

The invention also pertains to certain improvements whereby the manure or fertilizer will be thoroughly pulverized or disintegrated in the discharging operation and will be spread over a space wider than the width of the body.

Other objects and advantages of the invention will be disclosed in the subjoined description and explanation.

In the accompanying drawings, Figure 1 is a view in side elevation of the body of the manure-spreader, showing one form of my invention applied thereto and illustrating the rear end-gate in its raised position and the driving mechanism for the beater thrown out of gear. Fig. 2 is a similar view of like parts, but showing the driving mechanism for the beater in gear and the rear end-gate or shield in its lowered position. Fig. 3 is a view, partly in section and partly in elevation, of the rear portion of the body, showing the inner surface of the side thereof opposite the sides shown in Figs. 1 and 2 and illustrating the end-gate or shield in its raised position, but with the beater removed. Fig. 4 is a fragmental plan view of the rear part of the body, showing a portion of the deflector-frame and a portion of the end-gate. Fig. 5 is a view, partly in section and partly in elevation, of the rear portion of one of the sides of the body, showing the beater removed and illustrating a modification in the means for supporting and guiding the rear end-gate which is shown in its raised position; and Fig. 6 is a fragmental plan view thereof.

Like numerals of reference refer to corresponding parts throughout the different views of the drawings.

The reference-numeral 10 designates the box or body of the machine, which is mounted as usual on the ordinary running-gear (not shown) of a wagon and has at its bottom a rearwardly-traveling conveyer 11, employed for carrying the manure or fertilizer rearwardly within the body. Horizontally journaled at the rear end of the body and usually on brackets 12, secured to each side thereof, is a shaft 13, on which is mounted a cylindrical beater 14, which is provided with spikes or teeth 15 to engage the manure or fertilizer, so as to discharge it from the body. This beater, as well as the conveyer 11, may be driven by any suitable or well-known means; but in the present instance I have shown it as being operated by means of a sprocket-chain 16, which passes over a sprocket-wheel 17, mounted on one end of its shaft 13, and also passing over a sprocket-wheel 18, which is mounted on a shaft 19 on one side of the body and at the rear of the rear axle 20, on which is mounted the main driving-gear 21, which meshes with a pinion 22, mounted on an eccentric sleeve 23, which is provided with an upwardly-extending arm 24, to which is secured one end of a rod used for throwing the mechanism in and out of gear.

Rotatably mounted at the rear end of the body is an end-gate 25, which is curved in cross-section and has at each of its ends and rear portion a supporting-arm 26, which in the present instance I have shown as being journaled on the beater-shaft 13 between the inner surfaces of the brackets 12; but it is obvious that said arms may be pivotally secured to said brackets or another portion of the machine-body. Extending upwardly from the upper portion of one of the arms 26 is a crank-arm 27, to the upper end of which is secured one end of a rod 28, used for raising and lowering the end-gate, the other end of which rod is adjustably secured to a cross-head 29, which is mounted on the inner end of a rod 30, the other end of which is secured to a hand-lever 31, fulcrumed on the front portion of the body. The cross-head 29 is adjustably secured on the rod 30 by means of nuts 32, located on each side of the head. Extending through an opening in the lower portion of the cross-head 29 is another rod 33, which is secured at its other end to the arm 24 on the eccentric sleeve of the beater-operating mechanism. The rods 28 and 33 are adjustably connected to the cross-head 29 by means of nuts 34, which are located on said rods on each side of the cross-head. This means of connecting the rods 28 and 33 to the rod 30 provides a convenient and simple manner of adjusting said rods. Instead of employing the cross-head 29 and the rod 30 I may sometimes omit same and connect the front ends of the rods 28 and 33 directly to the hand-lever 31, as is shown in Fig. 2 of the drawings.

In order to guide and support the end-gate against the rearward pressure of the load, I may sometimes provide each of the sides of the body 10 near its rear end and on its inner surface with a curved groove or channel 34 to receive the ends of the end-gate, as will be readily understood by reference to Figs. 5 and 6 of the drawings.

Extending horizontally across the rear portion of the body is a supporting bar or rod 35 for the deflector-frame, and this rod or bar has each of its ends provided with downwardly-extending portions 36, which are secured to the outer surface of the sides of the body. The deflector-frame comprises a transverse portion or shield 37, which is located substantially in a horizontal position above the beater, but is preferably slightly curved in cross-section, as shown in the drawings. Secured to the portion 37 or shield near each of its ends and extending forwardly therefrom is an arm 38, which rest at their front ends on the supporting-bar 35 and are pivotally secured thereto, preferably by means of U-shaped straps 39; but it is evident that they may be secured to said bar by any suitable means. Coiled around the bar 35 near each of its ends is a spring 40, one end of which engages one of the arms 38 and the other end of which engages the downwardly-projecting portion 36 of said bar. The rear edge of the deflector-shield 37 has located thereon a rod 41, which projects from each end of the shield and is adapted to be received and supported by means of brackets 42, one of which is secured on the rear end of each of the rearward extensions 43 of the body. Secured on the deflector-shield 37 by means of pivots 44 are a series of downwardly-curved deflectors 45, each of which is adjustably secured on the shield 37 by means of securing-pins 46, inserted through suitable openings 47 in the shield. These deflectors and the deflector-shield 37 are employed to retard and stop the manure in its ascent as it is thrown upwardly and carried over by the beater and to so hold the manure as to cause it to be thoroughly pulverized or disintegrated by the teeth of the beater, for it will be understood that the deflectors are arranged or adapted to be arranged so as to partially surround the beater and to lie near its teeth and diagonally with respect to its surface—that is, some of them will be inclined toward one end of the beater and others in the opposite direction. This inclination of the deflectors will cause the manure or fertilizer to be retarded in its movements and to travel sidewise, and thus be subjected to the picking or disintegrating effect of several of the beater-teeth, besides thus causing the manure or fertilizer to be guided laterally, so that it will be spread over a space wider than the body or length of the beater.

The operation is simple and as follows: When it is desired to load the body, the hand-lever 31 is thrown to the position shown by continuous lines in Fig. 1 of the drawings, which operation will raise the end-gate 25 in front of the beater, so as to hold the manure away from the same, and at the same time the driving mechanism for the beater will be thrown and held out of gear. When the parts are in these positions, the machine may be driven to the field, when by throwing the hand-lever 31 to the position indicated by dotted lines in Fig. 1 or by continuous lines in Fig. 2 the end-gate will be lowered or rotated downwardly and the driving mechanism for the beater thrown into gear, after which the operation of discharging the load may be performed, in which operation the manure or fertilizer will be carried over by the beater and subjected to the action of the deflector-shield and its deflectors, as above stated. As the deflector frame or shield is pivotally mounted at its front portion and is also pressed downwardly by means of the springs 40, it is apparent that it will yield sufficiently to permit any unbreakable lumps or portions to be carried over by the beater, yet will be held in position so as to cause perfect pulverization of the manure or fertilizer.

By employing my present method of mounting and operating the end-gate—that is, so it can be rotated downwardly—the operation thereof is greatly facilitated, for it is obvious that it will be moved in the direction of the pressure of the load, whereas if it were moved upwardly from the conveyer or bottom of the body a certain amount of weight of the load would have to be overcome.

Having thus fully described my invention, what I claim as new, and desire to secure by Letters Patent, is—

1. In a manure-spreader, the combination with the body, of a rotary beater journaled at its rear end, and an end-gate capable of downward movement from a position in front of the beater, substantially as described.

2. In a manure-spreader, the combination with the body, of a rotary beater journaled at its rear end, and an end-gate capable of rearwardly-downward movement from a position in front of the beater, substantially as described.

3. In a manure-spreader, the combination with the body, of a rotary beater journaled at its rear end, and an end-gate capable of downward movement from an upward movement to a point in front of the beater, substantially as described.

4. In a manure-spreader, the combination with the body, of a rotary beater journaled at its rear end, and an end-gate capable of rearwardly-downward movement from and forwardly-upward movement to a point in front of the beater, substantially as described.

5. In a manure-spreader, the combination with the body, of a rotary beater journaled at its rear end, mechanism to rotate the beater, an end-gate movable rearwardly downward from and forwardly upward to a point in front of the beater, and mechanism whereby said end-gate can be moved from its lowered position to its raised position and the beater-driving mechanism simultaneously thrown out of gear, substantially as described.

6. In a manure-spreader, the combination with the body, of a rotary beater journaled at its rear end, mechanism to rotate the beater, an end-gate movable rearwardly downward from and forwardly upward to a point in front of the beater, and mechanism whereby said end-gate can be moved from its raised position to its lowered position and the beater mechanism simultaneously thrown into gear, substantially as described.

7. In a manure-spreader, the combination with the body, of a rotary beater journaled at its rear end, mechanism to rotate the beater, an end-gate movable downward from and upward to a point in front of the beater, and mechanism whereby said end-gate can be raised and the beater mechanism simultaneously thrown out of gear, substantially as described.

8. In a manure-spreader, the combination with the body, of a rotary beater journaled at its rear end, mechanism to rotate the beater, an end-gate movable downward from and upward to a point in front of the beater, and mechanism whereby said end-gate can be lowered from its raised position and the beater mechanism simultaneously thrown into gear, substantially as described.

9. In a manure-spreader, the combination with the body, of a rotary beater journaled at its rear end, an end-gate having at each of its ends a supporting-arm pivotally secured, one of said arms having an upwardly-extending crank, said end-gate capable of rearwardly-downward movement from and forwardly-upward movement to a point in front of the beater, mechanism to rotate the beater, a hand-lever fulcrumed on the front portion of the body, a rod uniting said lever and the crank of the end-gate, and another rod uniting said lever and a portion of the beater mechanism, substantially as described.

10. In a manure-spreader, the combination with the body, of a rotary beater journaled at its rear, mechanism to rotate the beater, an end-gate having at each of its ends a supporting-arm pivotally secured, a crank secured to one of said arms, said end-gate capable of rearwardly-downward movement from and forwardly-upward movement to a point in front of the beater, a hand-lever fulcrumed on the front portion of the body, a rod connected at one of its ends to said hand-lever and extending rearwardly, a cross-head adjustably secured on the inner portion of said rod, a rod secured at one of its ends to the crank and adjustably secured at its other end to the cross-head, another rod secured at one of its ends to a portion of the beater-driving mechanism and adjustably secured at its other end to the cross-head, substantially as described.

11. In a manure-spreader, the combination with the body each of its sides having on its inner rear portion a channel, a rotary beater journaled at the rear end of the body, mechanism to rotate the beater, an end-gate having at each of its ends a supporting-arm pivotally secured, a crank connected to the end-gate for moving the same, said end-gate capable of rearwardly-downward movement from and forwardly-upward movement to a point in front of the beater, a hand-lever fulcrumed on the front portion of the body, a rod uniting said lever and the crank of the end-gate, and another rod uniting said lever and a portion of the beater-driving mechanism, substantially as described.

12. In a manure-spreader, the combination with the body, of a rotary beater journaled at its rear end, means supported above and close to the beater whereby the manure or fertilizer will be retarded in its movements and deflected to both sides of the machine, and an end-gate movable downward from and upward to a point in front of the beater, substantially as described.

13. In a manure-spreader, the combination with the body, of means to move the load rearwardly therein, a rotary beater journaled at the rear end of the body, a retarding and deflecting device located above and close to the beater and curved so as about to conform to an arc of the circle described by the beater-teeth whereby the manure or fertilizer will be retarded in its movements and deflected to both sides of the machine, and an end-gate movable downward from and upward to a point in front of the beater, substantially as described.

14. In a manure-spreader, the combination with the body, of means to move the load rearwardly therein, a rotary beater journaled at the rear end of the body, a spring-pressed shield located above the beater and pivotally connected at its front portion to the body, a series of deflectors curved on their lower surfaces and connected at their upper portion to said shield, said deflectors being diagonally disposed in opposite directions above and near the beater, and an end-gate movable downward from and upward to a point in front of the beater, substantially as described.

LE GRAND KNIFFEN.

Witnesses:
CHAS. C. TILLMAN,
A. GUSTAFSON.